United States Patent
Kim et al.

(10) Patent No.: US 8,721,150 B2
(45) Date of Patent: May 13, 2014

(54) BACKLIGHT ASSEMBLY AND LIQUID CRYSTAL DISPLAY DEVICE USING THE SAME

(75) Inventors: Jae Bum Kim, Taegu-kwangyokshi (KR); Young Mi Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1455 days.

(21) Appl. No.: 11/287,090

(22) Filed: Nov. 22, 2005

(65) Prior Publication Data

US 2006/0193132 A1    Aug. 31, 2006

(30) Foreign Application Priority Data

Feb. 28, 2005   (KR) .............. 10-2005-16974

(51) Int. Cl.
*F21V 7/04* (2006.01)
*G09F 13/04* (2006.01)
*G09F 13/08* (2006.01)

(52) U.S. Cl.
USPC ........... 362/612; 362/611; 362/97.3; 362/613

(58) Field of Classification Search
USPC ........... 362/612, 611, 613, 97, 227, 230, 231, 362/236, 249, 252, 800, 555, 561; 349/61, 349/68; 345/82
See application file for complete search history.

(56) References Cited

U.S. PATENT DOCUMENTS

| | | | | |
|---|---|---|---|---|
| 5,808,592 A * | 9/1998 | Mizutani et al. | ............... | 345/83 |
| 6,536,914 B2 * | 3/2003 | Hoelen et al. | ............... | 362/231 |
| 6,540,377 B1 * | 4/2003 | Ota et al. | ............... | 362/231 |
| 6,583,831 B2 * | 6/2003 | Kim | ............... | 349/58 |
| 7,052,152 B2 * | 5/2006 | Harbers et al. | ............... | 362/30 |
| 7,217,004 B2 * | 5/2007 | Park et al. | ............... | 362/240 |
| 2002/0001192 A1 * | 1/2002 | Suehiro et al. | ............... | 362/240 |
| 2003/0132700 A1 * | 7/2003 | Ven | ............... | 313/500 |
| 2004/0008524 A1 * | 1/2004 | Lee et al. | ............... | 362/561 |
| 2004/0218388 A1 * | 11/2004 | Suzuki | ............... | 362/231 |
| 2005/0141244 A1 * | 6/2005 | Hamada et al. | ............... | 362/612 |
| 2005/0243576 A1 * | 11/2005 | Park et al. | ............... | 362/612 |
| 2005/0258438 A1 * | 11/2005 | Arik et al. | ............... | 257/88 |
| 2006/0087866 A1 * | 4/2006 | Ng et al. | ............... | 362/612 |
| 2006/0092666 A1 * | 5/2006 | Jeong et al. | ............... | 362/613 |
| 2006/0146563 A1 * | 7/2006 | Chen | ............... | 362/561 |
| 2007/0008740 A1 * | 1/2007 | Lee et al. | ............... | 362/612 |

FOREIGN PATENT DOCUMENTS

| | | |
|---|---|---|
| JP | 10-039301 | 2/1998 |
| JP | 2002-329587 | 11/2002 |
| JP | 2004-319458 | 11/2004 |

OTHER PUBLICATIONS

Office Action issued in corresponding Korean Patent Application No. 10-2005-0016974, mailed Jun. 27, 2011.

* cited by examiner

*Primary Examiner* — David J Makiya

(74) *Attorney, Agent, or Firm* — Brinks Gilson & Lione

(57) ABSTRACT

A backlight assembly and an LCD device containing the same include a plurality of light source modules containing sequentially arranged red, green, green, blue and red LEDs. The backlight assembly can improve color realization ratio and light efficiency in an LCD device by uniform illumination of an LCD panel with color-mixed white-color light.

4 Claims, 5 Drawing Sheets

BACKLIGHT ASSEMBLY AND LIQUID CRYSTAL DISPLAY DEVICE USING THE SAME

This application claims the benefit of priority under 35 U.S.C. §119 to Korean Patent Application No. P2005-0016974, filed Feb. 28, 2005, which is hereby incorporated by reference in its entirety.

BACKGROUND OF THE INVENTION

1. Field of the Invention

The present invention relates to a liquid crystal display (LCD) device, and more particularly, to a backlight assembly and an LCD device using the same.

2. Discussion of the Related Art

The cathode ray tube (CRT) has been widely used in television receivers and in monitors of measuring instruments, information terminals, and the like. However, the size and weight of a CRT limits production of small, lightweight CRT-containing devices. As a result, other display devices are increasingly taking the place of CRTs. Examples of these display devices include liquid crystal display (LCD) devices utilizing an electro-optical effect, plasma display panels (PDP) utilizing gaseous discharge, and electroluminescent display (ELD) devices utilizing electro-luminescence.

In view of their light weight, thin profile, and low power consumption, LCD devices are among the most popular display devices. Accordingly, there is a great demand for LCD devices, which are widely utilized in desktop computers, laptop computers, and large-size display devices.

A typical LCD device includes an LCD panel for displaying a picture image and a driving part for applying a driving signal to the LCD panel. The LCD panel typically includes first and second glass substrates and a liquid crystal layer interposed therebetween. Spacers maintain a predetermined gap enabling the first and second glass substrates to be bonded by a sealant having a liquid crystal injection inlet through which liquid crystal is injected.

The first glass substrate (TFT array substrate), includes a plurality of gate and data lines, a plurality of pixel regions and pixel electrodes, and a plurality of thin film transistors (TFTs). The plurality of gate lines runs in one direction at fixed intervals. The plurality of data lines run perpendicular to the gate lines at fixed intervals. A matrix of pixel regions is defined by the plurality of gate lines and data lines crossing each other in which each pixel region contains a pixel electrode. Each of the TFTs is arranged to be switchably responsive to a signal from a selective gate line, which is transmitted through a data line to a pixel electrode.

The second glass substrate (color filter substrate) includes a black matrix layer for shielding light incident on regions excluding the pixel regions of the first substrate, a color filter layer (R, G, B) for displaying colors, and a common electrode for obtaining a picture image.

An LCD device displays picture images by controlling transmittance of ambient light. However, because an LCD device does not emit light, the LCD device requires an additional light source, such as a backlight unit. A backlight unit may be classified as a direct-type or edge-type unit depending on the position of the light source relative to the display area.

An LCD device may employ a variety of light sources in a backlight unit, including electroluminescent (EL) lamps, light-emitting diode (LED) lamps, cold cathode fluorescent lamps (CCFL), and hot cathode fluorescent lamps (HCFL). Because of their long lifetime, thin profile and low power consumption, CCFLs are often used as light sources for large-sized color TFT LCD devices.

The fluorescent discharge tube used in a CCFL utilizes the penning effect when injecting a hydrargyrum gas containing Argon Ar and Neon Ne at a low temperature. Electrodes are formed at both ends of the fluorescent discharge tube, and a plate-shaped cathode is formed therein. When a voltage is applied thereto, electric charges inside the fluorescent discharge tube collide against the plate-shaped cathode, generating secondary electrons. Circumferential elements are excited by the secondary electrons and plasma is generated. In the process, the circumferential elements emit strong ultraviolet rays, which excite a fluorescent substance, thereby emitting visible rays.

In an edge-type backlight unit, a lamp unit is installed at one side of a light-guiding plate. Edge-type backlight units are typically utilized in smaller LCD devices, such as laptop or desktop computer monitors. An edge-type backlight has a thin profile and can provide uniform luminance and a long life in an LCD device.

Direct-type backlight units are being increasingly developed for use in large LCD devices that are 20-inch or larger in size. A direct-type backlight unit includes a plurality of lamps formed in a line on a lower surface of a light-diffusion plate, whereby the entire surface of the LCD panel is directly illuminated with the light. A direct-type backlight unit utilizes light more efficiently than an edge-type backlight unit. Since larger LCD devices require higher luminance, direct-type backlight units are often utilized in larger television monitors.

However, because monitors employing a direct type backlight unit employ a plurality of lamps and are used for long periods of time, the lamps are prone to fail. In contrast, an edge-type backlight unit having lamp units at both sides of the light-guiding plate is less affected by a failed lamp unit, because the decreased luminance accompanying a failed lamp does not present as much a problem as compared to an LCD device employing a direct-type backlight unit.

An LCD device carrying a direct-type backlight unit includes a plurality of lamps underneath a screen. If one of the lamps fails or reaches the end of its lamp life, a portion of the screen corresponding to the location of the failed lamp becomes darker in comparison to the surrounding portions of the screen. Accordingly, there is a need for direct-type LCD devices having simple structures suitable for disassembling and re-assembling a backlight unit assembly in an LCD device.

FIG. 1 is a perspective view depicting a direct type backlight assembly according to the related art. The direct type backlight assembly includes a plurality of fluorescent lamps 1, an outer case 3, and light-scattering means 5a, 5b and 5c disposed between the fluorescent lamps 1 and an LCD panel (not shown). A fluorescent substance is coated on an inner surface of each fluorescent lamp 1. The outer case 3 fixes and supports the plurality of fluorescent lamps 1.

The light-scattering means 5a, 5b and 5c prevent a silhouette of the fluorescent lamps 1 from appearing on the surface of the LCD panel screen, and provide a light source having uniform luminance. To increase light-scattering of non-uniform light from the fluorescent lamps, the direct-type LCD device includes a plurality of diffusion sheets, a diffusion plate and a protective sheet between the fluorescent lamps 1 and the LCD panel.

However, backlight assemblies employing fluorescent lamps according to the related art may often utilize fluorescent lamps having emission characteristics producing a low color realization ratio. Moreover, the ability to obtain a backlight unit having high luminance is hampered by limits in size and capacity of the fluorescent lamp.

Backlight units are often used for illuminating the screen of an LCD device, whereby the viewer can read information displayed on the screen in dark surroundings. To satisfy the demand for LCD devices having suitable design characteristics, a thin profile, and low power consumption, there is a increasing need for backlight units utilizing a thin light-guiding plate, a function for displaying various colors, and LED lamps requiring less power consumption.

FIG. 2 is a perspective view depicting a backlight assembly employing LED lamps according to the related art. In FIG. 2, LED light sources 22 are positioned at both sides of a light-guiding plate 21 formed at the rear of an LCD panel. The LCD panel is illuminated with light emitted from the LED light sources 22, thereby enabling the display of images in dark surroundings. Each of the LED light sources 22 includes a plurality of lamps 23 arranged in one direction at fixed intervals, wherein the lamps 23 include red, green and blue LEDs.

When displaying images on the LCD panel, the backlight unit turns on the LED lamps 23 in the LED light sources 22. As a voltage is applied to the LED lamps 23, light is emitted and dispersed in the light-guiding plate 21. The dispersed light is color-mixed, whereby the LCD panel is illuminated with white-color light. The use of LED lamps in the backlight unit of an LCD device facilitates low power consumption and miniaturization.

An LED is a solid, semiconductor photoelectric conversion device providing higher reliability and a longer life than a CRT. To emit light from an LED, a D.C. voltage of 1.5V is applied thereto. Because there is no requirement for a DA-AC converter, LEDs facilitate decreased power consumption.

However, related art LED backlight assemblies possess certain disadvantages. For example, when LED light sources are positioned at opposite sides of the light-guiding plate, it is difficult to generate uniform white-color light by color-mixing the red, green and blue light emitted from the red, green and blue LEDs. Accordingly, this may lead to reduced lighting efficiencies and color realization ratios.

SUMMARY OF THE INVENTION

The present invention is directed to a backlight assembly and an LCD device using the same which may obviate one or more problems associated with related art devices.

One object of the present invention is to provide a backlight assembly, and an LCD device using the same, to improve color realization ratio and light efficiency by illuminating an LCD panel with white-color light uniformly color-mixed.

In one aspect of the present invention, a backlight assembly includes a plurality of light source modules. The light source modules include a plurality of colored LEDs. One or more of the plurality of light source modules includes sequentially arranged red, green, green, blue, and red LEDs.

In another aspect of the present invention, a backlight assembly includes a light source having a plurality of the above described light source modules, a light-diffusion plate, and a frame holding the light source and the light-diffusion plate. The light diffusion plate is formed over the light source and diffuses light emitted from the light source.

In another aspect of the present invention, an LCD device includes a backlight assembly according to the present invention and an LCD panel assembly positioned over the backlight assembly for displaying images using light emitted from the backlight assembly.

In a further aspect, a method of making an LCD device containing a backlight unit assembly according to the present invention is provided, as well as a method of using the same to transmit light to a liquid crystal display panel.

DETAILED DESCRIPTION OF THE INVENTION

Figure 1:
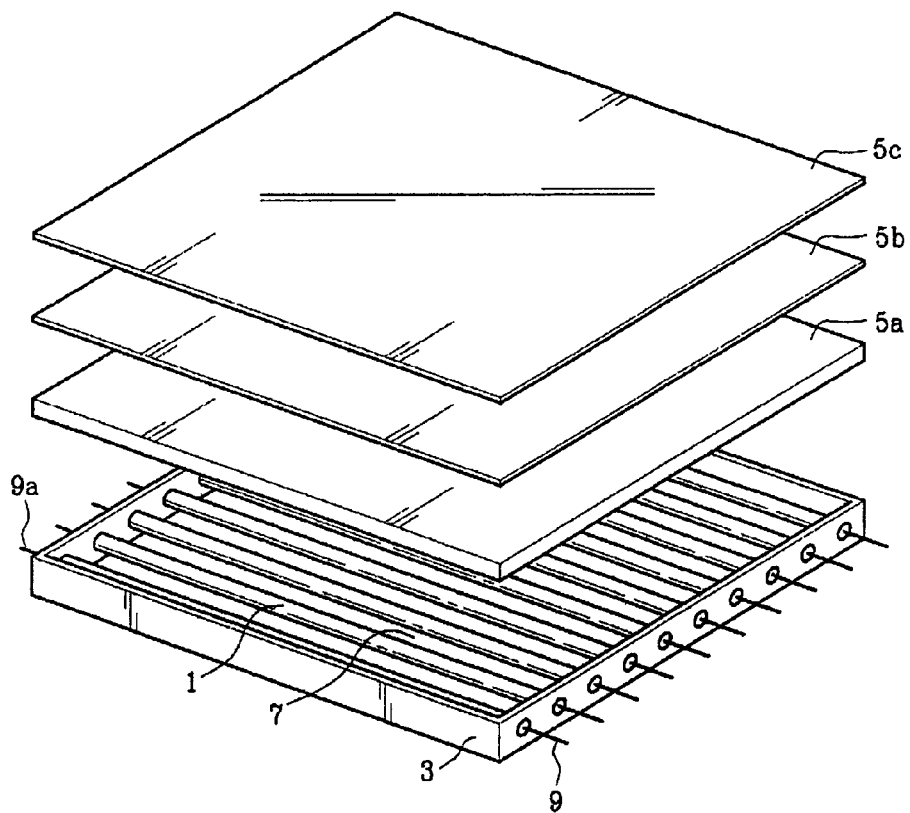
FIG. 1 is a perspective view depicting a direct type backlight assembly according to the related art.
Figure 2:
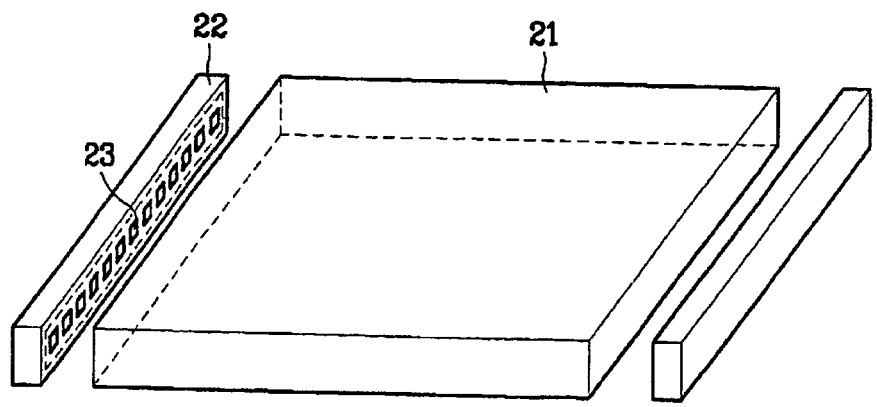
FIG. 2 is a perspective view of depicting a backlight assembly using an LED according to the related art.
Figure 3:
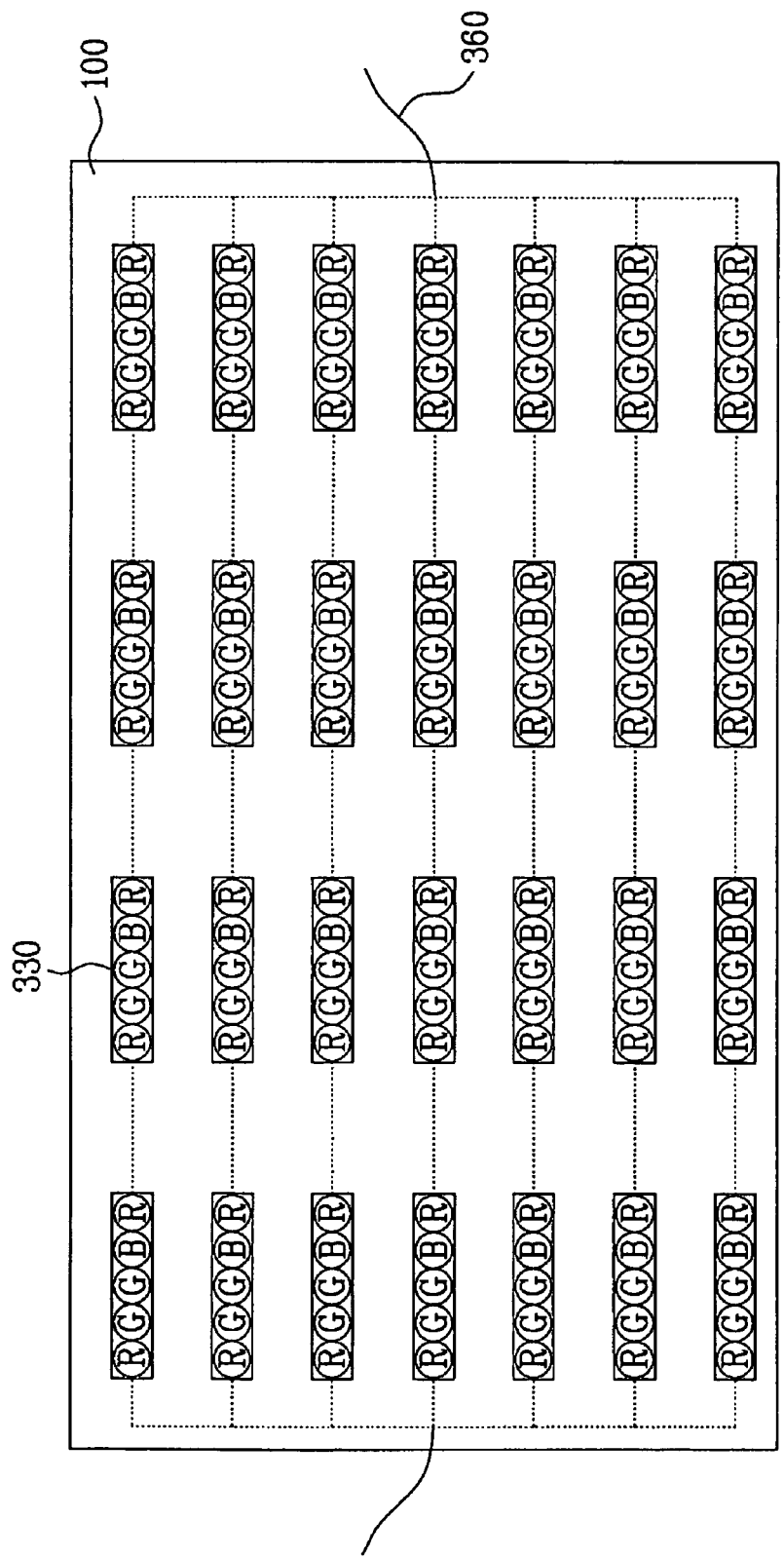
FIG. 3 is a plane view depicting a backlight assembly according to the present invention.

FIG. 3 is a plane view depicting a backlight assembly according to one aspect of the present invention. In FIG. 3, the backlight assembly includes a metal-core printed circuit board (MC-PCB) substrate 100, a light source 330, and a wire 360.

The light source 330 includes a plurality of modules arranged in a matrix. Each module includes LEDs sequentially arranged in the order, red R, green G, green G, blue B, and red R. Power is supplied to each module through a plurality of wires 360. The wires 360, depicted as dotted line in FIG. 3, are provided in a rear surface of the backlight assembly.

When LEDs sequentially arranged in the order, red R, green G, green G, blue B, and red R are turned-on, light emitted from the respective LEDs is color-mixed to generate a white-color light capable of illuminating a rear surface of an LCD panel. White-color light incident on an LCD panel is modulated according to the alignment of liquid crystals. Light is modulated as it passes through a color filter of an opposing substrate and color images are displayed.

Figure 4:
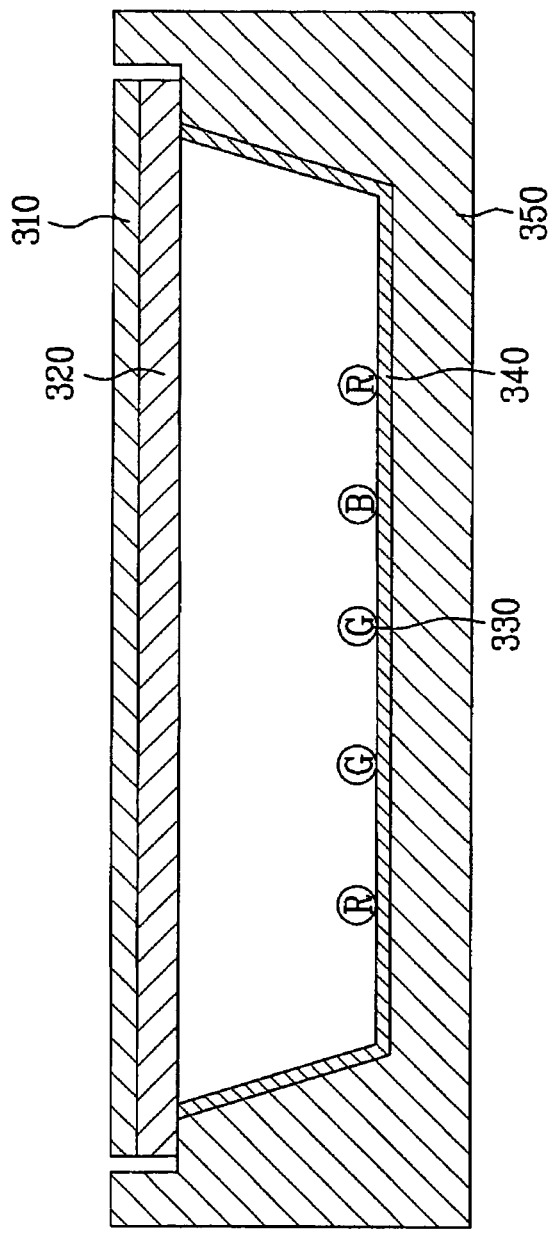
FIG. 4 is a cross sectional view depicting a backlight assembly according to the present invention.

FIG. 4 is a cross sectional view depicting a backlight assembly according to another aspect of the present invention. In FIG. 4, the backlight assembly includes a light source 330, a light-diffusion plate 320, a light-diffusion sheet 310, a mold frame 350, and a reflecting plate 340.

The light source 330 includes a plurality of modules arranged in a matrix in which each module includes LEDs arranged in the order, red R, green G, green G, blue B and red R. The light-diffusion plate 320 and the light-diffusion sheet 310 are provided over the light source 330. The light-diffusion plate 320 and the light-diffusion sheet 310 diffuse light emitted from the light source 330. The mold frame 350 is configured to hold the light source 330, the light-diffusion plate 320 and the light-diffusion sheet 310. The reflecting sheet 340 is formed on the inner surface of the mold frame 350.

As the LEDs are turned-on, red, green and blue light emitted from the respective LEDs is dispersed in the inner space of the mold frame 350 and color-mixed, thereby generating a white-color light. The white-color light is diffused on the light-diffusion plate 320.

Although the aforementioned backlight assembly is a direct type assembly, a backlight assembly according to the present invention may be also formed as an edge type assembly.

Figure 5:
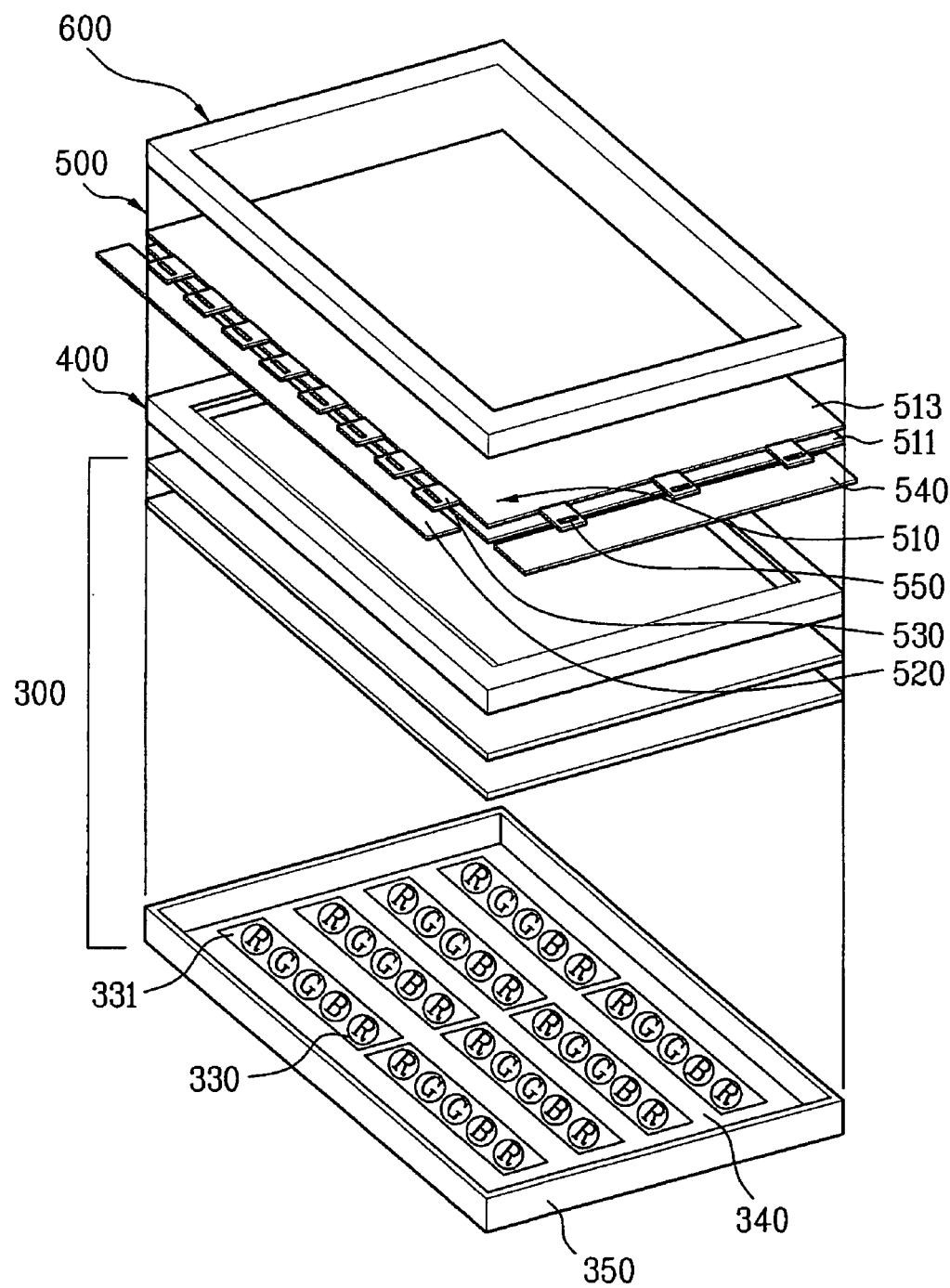
FIG. 5 is an exploded perspective view depicting an LCD device having a backlight assembly according to the present invention.

FIG. 5 is an exploded perspective view depicting a backlight assembly according to an aspect of the present invention. In FIG. 5, the backlight assembly 300 includes a light source 330, a reflecting plate 340, a light-diffusion plate 320, a light-diffusion sheet 310, and a mold frame 350. Each light source 330 includes a plurality of modules arranged in a matrix. Each module includes LEDs sequentially arranged in order, red R, green G, green G, blue B and red R. The reflecting plate 340 is disposed below the light source 330. The light-diffusion plate 320 is disposed above the light source 330. The light-diffusion sheet 310 is positioned on the light-diffusion plate 320. The mold frame 350 holds the light source 330, the reflecting plate 340, the light-diffusion plate 320, and the light-diffusion sheet 310.

The mold frame 350 may be in the form of a rectangular box with an open top having an inner space with a predetermined depth for holding the light source 330 and the reflecting plate 340. A step on an inner upper edge of the mold frame stably supports the light-diffusion plate 320 and the light-diffusion sheet 310 (FIG. 4). Although the mold frame 350 is herein described as being rectangular in shape, it may take on various other shapes as well.

The reflecting plate 340 is provided on the inner surface of the inner receiving space of the mold frame 350. A plurality of holes (not shown) is formed at fixed intervals in the reflecting plate 340. Thus, the LEDs in the light source 330 are exposed through the holes of the reflecting plate 340.

When light emitted from the light source 330 is mixed in the inner space of the mold frame 350, a white-color light is generated. Although white-color light may be directly incident to the light-diffusion plate 320, some of the white-color light may be reflected from the reflecting plate 340 toward the light-diffusion plate 320, which diffuses the mixed white-color light so that the mixed white-color light is emitted at a wide-angle range.

FIG. 5 further depicts an LCD device having a backlight assembly according to the present invention. In FIG. 5, the LCD device includes an LCD panel assembly 500 for displaying images and a direct type backlight assembly 300 for providing light to the LCD panel assembly 500.

The LCD panel assembly 500 includes an LCD panel 510, a data PCB 520, a gate PCB 540, a data tape carrier package 530, and a gate tape carrier package 550. The LCD panel 510 includes a TFT substrate 511, a color filter substrate 513, and a liquid crystal layer (not shown). The color filter substrate 513 is disposed over the TFT substrate 511, and the liquid crystal layer is disposed between the TFT substrate 511 and the color filter substrate 513.

The TFT substrate 511 includes a plurality of thin film transistors (TFTs) arranged in a matrix (not shown), each TFT functioning as a switch. In each TFT, a gate line is connected to a gate electrode, a data line is connected to a source electrode, and a pixel electrode is connected to a drain electrode.

The gate line is electrically connected to a gate PCB 540 through a gate tape carrier package 550. The data line is electrically connected to a data PCB 520 through a data tape carrier package 530. When data and gate PCBs 520 and 540 receive electrical signals from external sources, the data and gate PCBs 520 and 540 transmit a driving signal and a timing signal for driving and controlling the LCD panel assembly 500 to the data and gate lines through the data tape carrier package 530 and the gate tape carrier package 550.

The color filter substrate 513 includes RGB pixels for displaying images. Thus, when light passes through the RGB pixels, a predetermined-color image can be obtained. A common electrode is formed on an entire surface of the color filter substrate 513. As voltage is applied to the LCD panel 510, liquid crystal molecules are aligned when an electric field is generated between the common electrode and a pixel electrode in a TFT.

A backlight assembly according to the present invention and an LCD device using the same possess several advantages. First, the light source includes a plurality of modules arranged in a matrix, each module containing LEDs sequentially arranged in order, red R, green G, green G, blue B and red R. Mixing emitted light according to this arrangement makes it possible to generate a more uniform white-color light. Thus, an LCD panel uniformly illuminated with this white-color light provides improvements with respect to lighting efficiency and color realization ratio.

Modules arranged according to the above described matrix may be selectively controlled, thereby allowing luminance and color temperature to be controlled with simplicity and ease. Furthermore, luminance may be modulated by increasing or decreasing the number of modules in a large-size backlight assembly.

Instead of separately assembling each of the respective LEDs, multiple modules may be made to contain LEDs arranged in the order, red R, green G, green G, blue B and red R. This can improve the efficiency in assembling the backlight assembly.

It will be apparent to those skilled in the art that various modifications and variations in the embodiments disclosed in the written description, claims and appended drawings may be made without departing from the spirit or scope of the present invention. Thus, it is intended that the present invention covers the modifications and variations of this invention provided they come within the scope of the written description and the appended claims and their equivalents.

What is claimed is:

1. An LED backlight assembly comprising a plurality of light source modules arranged in a matrix comprising a plurality of colored LEDs,
    a light-diffusion plate disposed over the plurality of light source modules, wherein the light-diffusion plate diffuses light emitted from the plurality of light source modules;
    a frame holding the plurality of light source modules and the light-diffusion plate;
    a reflecting plate disposed on an inner surface of the frame, wherein a plurality of holes is formed at fixed intervals in the reflecting plate;
    wherein the light source modules are aligned with a plurality of rows and columns, each light source module being positioned at an intersection of each row and each column of the light source modules,
    wherein each light source module comprises sequentially arranged in the order of a red LED, a pair of neighboring green LEDs, a blue LED, and a red LED in a line;
    wherein the LEDs in the each light source module are exposed through the holes of the reflecting plate;
    wherein one or more of the plurality of light source modules is disposed on a metal-core printed circuit board; and
    wherein the light source modules are selectively controlled, thereby allowing luminance and color temperature to be controlled with simplicity and ease.

2. The LED backlight assembly of claim 1, further comprising a light diffusion sheet disposed on the light diffusion plate, wherein the frame comprises a step on an inner upper edge of the frame supporting the light diffusion plate and the light diffusion sheet.

3. An LCD device comprising:
    an LCD Panel assembly; and
    a backlight assembly comprising:
    a plurality of light source modules arranged in a matrix comprising a plurality of colored LEDs, wherein each light source module comprises sequentially arranged in the order of a red LED, a pair of neighboring green LEDs, a blue LED, and a red LED in a line on a metal-core printed circuit board;

a light-diffusion plate disposed over the light source, wherein the light-diffusion plate diffuses light emitted from the light source; and a frame holding the light source and the light-diffusion plate;

a reflecting plate disposed on an inner surface of the frame, wherein a plurality of holes is formed at fixed intervals in the reflecting plate;

wherein the LEDs in the each light source module are exposed through the holes of the reflecting plate;

wherein the LCD Panel assembly is disposed over the backlight assembly and displays images using light emitted from the backlight unit assembly, and wherein the light source modules are aligned with a plurality of rows and columns, each light source module being positioned at an intersection of each row and each column of the light source modules;

wherein the light source modules are selectively controlled, thereby allowing luminance and color temperature to be controlled with simplicity and ease.

4. The LCD device of claim 3, wherein the LCD panel assembly comprises an LCD panel, a data PCB, a gate PCB, a data tape carrier package, and gate tape carrier package.

* * * * *